United States Patent
Shin et al.

(10) Patent No.: US 11,099,606 B2
(45) Date of Patent: Aug. 24, 2021

(54) PRINTED CIRCUIT BOARD, DISPLAY DEVICE COMPRISING THE SAME, AND MANUFACTURING METHOD FOR THE SAME

(71) Applicant: SAMSUNG ELECTRO-MECHANICS CO., LTD., Suwon-si (KR)

(72) Inventors: Jae Ho Shin, Suwon-si (KR); Ju Ho Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 44 days.

(21) Appl. No.: 16/821,035

(22) Filed: Mar. 17, 2020

(65) Prior Publication Data
US 2021/0181799 A1    Jun. 17, 2021

(30) Foreign Application Priority Data
Dec. 11, 2019  (KR) .................. 10-2019-0164457

(51) Int. Cl.
*G06F 1/16* (2006.01)
*G09F 9/30* (2006.01)

(52) U.S. Cl.
CPC ............ *G06F 1/1652* (2013.01); *G09F 9/301* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,675,470 B2* | 1/2004 | Muramatsu | ........ | H01R 12/7076 29/832 |
| 7,599,193 B2* | 10/2009 | Park | .................... | H01L 23/4985 361/783 |
| 7,737,913 B2* | 6/2010 | Jang | .................... | G02F 1/13452 345/1.1 |
| 7,948,768 B2* | 5/2011 | Park | .................... | H01L 23/4985 361/783 |
| 8,581,813 B2* | 11/2013 | Park | .................... | G09G 3/3648 345/87 |
| 9,343,025 B2* | 5/2016 | Kim | .................... | G09G 3/3648 |
| 9,349,684 B2* | 5/2016 | Kim | ................... | H01L 23/04 |
| 9,367,094 B2* | 6/2016 | Bibl | .................... | H01L 23/5384 |
| 9,496,216 B2* | 11/2016 | Chun | ...................... | H01L 24/06 |

(Continued)

FOREIGN PATENT DOCUMENTS

| | | |
|---|---|---|
| KR | 10-1381327 B1 | 4/2014 |
| KR | 10-2015-0062556 A | 6/2015 |
| KR | 10-2016-0097948 A | 8/2016 |

*Primary Examiner* — Lisa Lea-Edmonds
(74) *Attorney, Agent, or Firm* — Morgan, Lewis & Bockius LLP (57) ABSTRACT

The present disclosure relates to a printed circuit board, a display device including the same, and a manufacturing method therefor. The printed circuit board includes a rigid region; and a flexible region comprising a flexible layer having a first surface and a second surface on an opposite side to the first surface, a reinforcing structure disposed on the first surface of the flexible layer, and a conductor pattern disposed on the second surface of the flexible layer. A material of the reinforcing structure has a coefficient of thermal expansion lower than that of a material of the flexible layer.

20 Claims, 9 Drawing Sheets

(56) References Cited

U.S. PATENT DOCUMENTS

| | | | |
|---|---|---|---|
| 9,582,036 B2* | 2/2017 | Bibl | H01L 23/5386 |
| 9,784,911 B2* | 10/2017 | Jung | G02B 6/0091 |
| 9,871,899 B2* | 1/2018 | Kim | H04M 1/0268 |
| 9,922,966 B2* | 3/2018 | Bibl | G09G 3/32 |
| 10,147,711 B2* | 12/2018 | Bibl | G04G 9/10 |
| 10,535,642 B2* | 1/2020 | Bibl | H01L 23/5387 |
| 10,631,408 B2* | 4/2020 | Koo | H05K 1/028 |
| 10,692,452 B2* | 6/2020 | Kobayashi | G02B 27/017 |
| 10,788,693 B2* | 9/2020 | Kwon | G06F 1/1652 |
| 10,809,861 B2* | 10/2020 | Kim | G06F 3/045 |
| 10,921,853 B2* | 2/2021 | Lee | G06F 1/1626 |
| 10,957,678 B2* | 3/2021 | Bibl | H01L 31/0216 |
| 11,023,010 B2* | 6/2021 | Park | G06F 3/041 |
| 2008/0074853 A1* | 3/2008 | Jang | H05K 1/189 361/749 |
| 2008/0192420 A1* | 8/2008 | Imajo | G02F 1/13452 361/679.02 |
| 2015/0156877 A1 | 6/2015 | Kang et al. | |
| 2019/0369668 A1* | 12/2019 | Kim | H01L 51/5237 |
| 2020/0310577 A1* | 10/2020 | Jeon | H01L 51/5253 |
| 2020/0403321 A1* | 12/2020 | Kang | H01Q 21/0025 |

* cited by examiner

PRINTED CIRCUIT BOARD, DISPLAY DEVICE COMPRISING THE SAME, AND MANUFACTURING METHOD FOR THE SAME

CROSS-REFERENCE TO RELATED APPLICATION(S)

This application claims benefit of priority to Korean Patent Application No. 10-2019-0164457, filed on Dec. 11, 2019, in the Korean Intellectual Property Office, the disclosure of which is incorporated herein by reference in its entirety.

TECHNICAL FIELD

The present disclosure relates to a printed circuit board, for example, a rigid-flexible printed circuit board (RFPCB), and a display device including the same.

BACKGROUND

Recently, printed circuit boards, which are essentially employed in electronic devices, are required to be manufactured to be relatively thinner and smaller while having increased circuit density. In this regard, dimensional stability of printed circuit boards has become important. For example, a highly layered printed circuit board, as a finished product, may be problematic when being assembled with other components due to slight deformation of each layer and a difference in coefficients of thermal expansion for each material. Among others, a high multilayer rigid-flexible printed circuit board using a flexible material may have a structure much more disadvantageous in terms of dimensional stability.

For example, it is important for the high multilayer rigid-flexible printed circuit board, which needs to be connected to a display panel or a chip-on film, to manage a dimension of an anisotropic conductive film (ACF) bonding pad. Meanwhile, the ACF bonding pad is formed at the beginning of a process and is then subject to multiple lamination processes to satisfy a target dimension and tolerance. A substrate, on which the ACF bonding pad is formed, is a flexible material and thus has a significant coefficient of thermal expansion (CTE). In this regard, there may be limitations on satisfying desired levels of performance due to deformations of the flexible material, which may be caused during subsequent processes after the ACF bonding pad is formed.

SUMMARY

An aspect of the present disclosure is to provide a printed circuit board having improved dimensional stability, a display device including the same, and a manufacturing method therefor.

Another aspect of the present disclosure is to provide a printed circuit board allowing more precise dimension management and capable of having improved yield and quality management, a display device including the same and a manufacturing method therefor.

Another aspect of the present disclosure is to provide a printed circuit board capable of having a more densely formed anisotropic conductive film (ACF) bonding pad and thus having improved display resolution, a display device including the same and a manufacturing method thereof.

According to an aspect of the present disclosure, a printed circuit board has improved dimensional stability by forming a reinforcing structure having a low coefficient of thermal expansion (CTE) on a surface opposite to a surface on which a conductor pattern, such as an ACF bonding pad, is formed based on a flexible layer.

For example, a printed circuit board according to an example of the present disclosure may include a rigid region; and a flexible region comprising a flexible layer having a first surface and a second surface on an opposite side to the first surface, a reinforcing structure disposed on the first surface of the flexible layer, and a conductor pattern disposed on the second surface of the flexible layer. A material of the reinforcing structure has a coefficient of thermal expansion lower than that of a material of the flexible layer.

Further, a display device according to an example of the present disclosure may include a display panel; and a printed circuit board connected to the display panel. The printed circuit board includes a rigid region and a flexible region. The flexible region includes a flexible layer having a first surface and a second surface on an opposite side to the first surface, a reinforcing structure disposed on the first surface of the flexible layer, and a conductor pattern disposed on the second surface of the flexible layer. A material of the reinforcing structure has a coefficient of thermal expansion lower than that of a material of the flexible layer.

For example, a method for manufacturing a printed circuit board according to an example of the present disclosure may include preparing a flexible layer including a first region and a second region; forming wiring layers on one surface and the other surface in the first region of the flexible layer, and forming, on one surface in the second region of the flexible layer, a conductor pattern connected to the wiring layer formed on one surface in the first region of the flexible layer; forming a reinforcing structure including a material having a coefficient of thermal expansion lower than that of a material of the flexible layer on the other surface in the second region of the flexible layer; and respectively forming a plurality of insulating layers and a plurality of wiring layers on one surface and the other surface in the first region of the flexible layer.

BRIEF DESCRIPTION OF DRAWINGS

The above and other aspects, features and other advantages of the present disclosure will be more clearly understood from the following detailed description, taken in conjunction with the accompanying drawings, in which.

DETAILED DESCRIPTION

Hereinafter, the present disclosure will be described with reference to the accompanying drawings. In the drawings, shapes, sizes, and the like, of components may be exaggerated or omitted for clarity.

Figure 1:
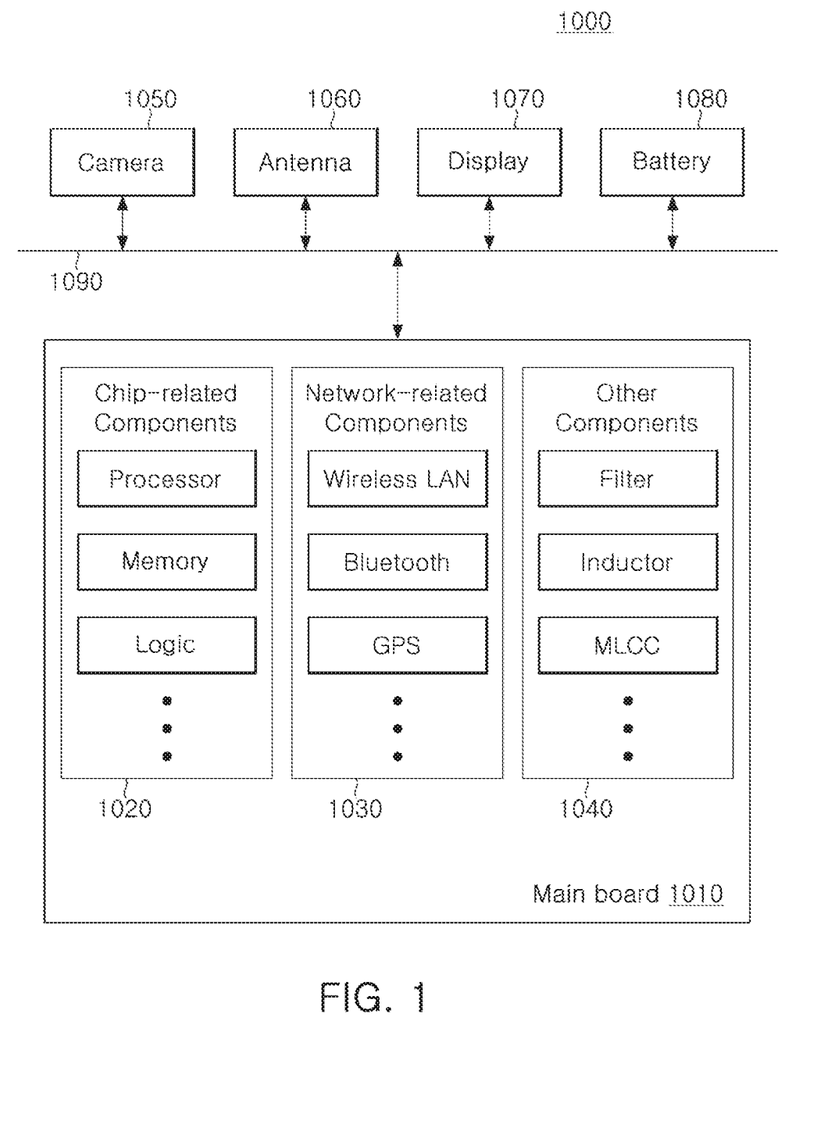
FIG. 1 is a block diagram schematically illustrating an example of an electronic device system.

FIG. 1 is a block diagram schematically illustrating an example of an electronic device system.

Based on FIG. 1, an electronic device 1000 accommodates a mainboard 1010 therein. The mainboard 1010 includes chip-related components 1020, network-related components 1030, other components 1040, and the like, physically and/or electrically connected thereto. Said components are connected to other electronic components described below, thereby creating various signal lines 1090.

The chip-related components 1020 may include a memory chip such as a volatile memory (for example, a dynamic random access memory (DRAM)), a non-volatile memory (for example, a read only memory (ROM)), a flash memory, or the like; an application processor chip such as a central processor (for example, a central processing unit (CPU)), a graphics processor (for example, a graphics processing unit (GPU)), a digital signal processor, a cryptographic processor, a microprocessor, a microcontroller, or the like; and a logic chip such as an analog-to-digital converter, an application-specific integrated circuit (ASIC), or the like, but is not limited thereto. Other types of chip-related components may be included. In addition, these chip-related components 1020 may be combined with each other. The chip-related components 1020 may be in the form of a package containing the previously described chip-related components and/or electronic components.

The network-related component 1030 may include protocols such as wireless fidelity (Wi-Fi) (Institute of Electrical And Electronics Engineers (IEEE) 802.11 family, or the like), worldwide interoperability for microwave access (WiMAX) (IEEE 802.16 family, or the like), IEEE 802.20, long term evolution (LTE), evolution data only (Ev-DO), high speed packet access+(HSPA+), high speed downlink packet access+(HSDPA+), high speed uplink packet access+(HSUPA+), enhanced data GSM environment (EDGE), global system for mobile communications (GSM), global positioning system (GPS), general packet radio service (GPRS), code division multiple access (CDMA), time division multiple access (TDMA), digital enhanced cordless telecommunications (DECT), Bluetooth, 3G, 4G and 5G protocols, and any other wireless and wired protocols designated after the abovementioned protocols, but is not limited thereto. The network-related components 1030 may also include a variety of other wireless or wired standards or protocols. In addition, the network-related components 1030 may be combined with each other, together with the chip-related components 1020 described above.

Other components 1040 may include a high frequency inductor, a ferrite inductor, a power inductor, ferrite beads, a low temperature co-fired ceramic (LTCC), an electromagnetic interference (EMI) filter, a multilayer ceramic capacitor (MLCC), or the like, but are not limited thereto. The other components 1040 may also include passive components, or the like, used for various other purposes. In addition, the other components 1040 may be combined with each other, together with the chip-related components 1020 or the network-related components 1030 described above.

The electronic device 1000 may include other components, which may or may not be physically and/or electrically connected to the mainboard 1010, depending on a type of the electronic device 1000. These other components may include, for example, a camera module 1050, an antenna module 1060, a display device 1070, a battery 1080, but are not limited thereto. The other components may also include an audio codec, a video codec, a power amplifier, a compass, an accelerometer, a gyroscope, a speaker, a mass storage unit (for example, a hard disk drive), a compact disk (CD), a digital versatile disk, or the like. These other components may also include other components, or the like, used for various purposes depending on a type of electronic device 1000.

The electronic device 1000 may be a smartphone, a personal digital assistant (PDA), a digital video camera, a digital still camera, a network system, a computer, a monitor, a tablet PC, a laptop PC, a netbook PC, a television, a video game machine, a smartwatch, an automotive component, or the like, but is not limited thereto. The electronic device 1000 may be any other electronic device processing data.

Figure 2:
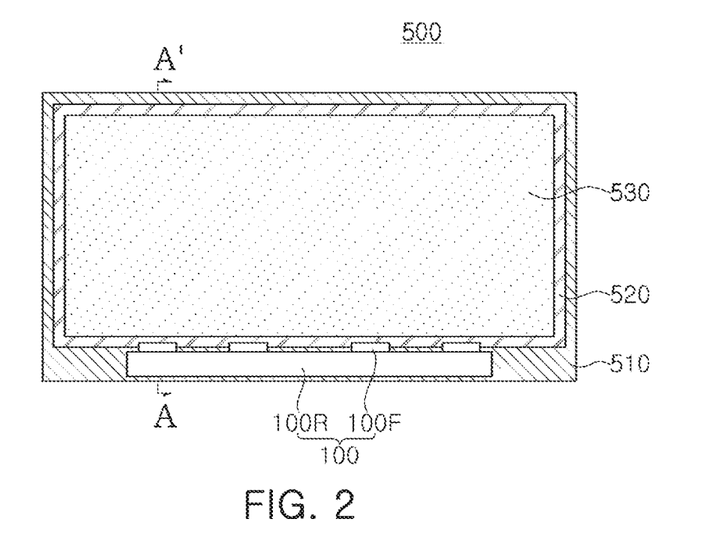
FIG. 2 is a planar view schematically illustrating an example of a display device.

FIG. 2 is a planar view schematically illustrating an example of a display device.

Figure 3:
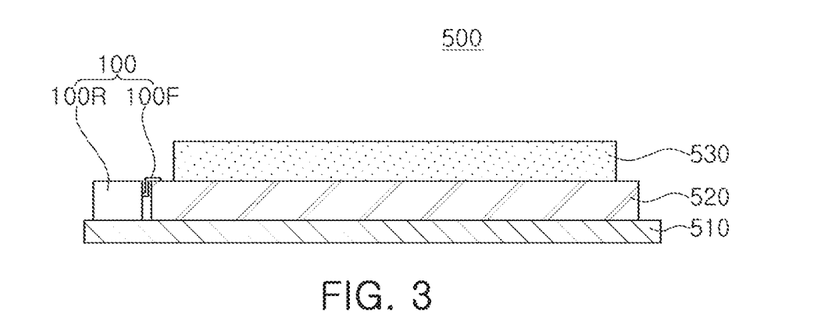
FIG. 3 is a schematic cross-sectional view taken along line A-A' of the display device of FIG. 2.

FIG. 3 is a schematic cross-sectional view taken along line A-A' of the display device of FIG. 2.

Figure 4:
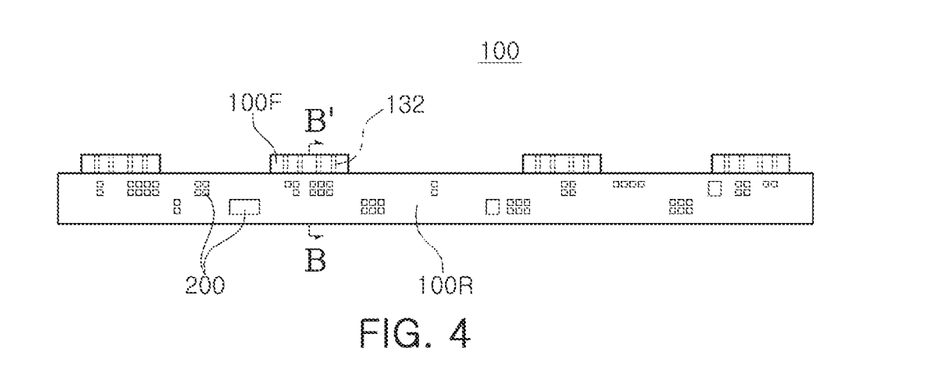
FIG. 4 is a planar view schematically illustrating a printed circuit board of FIG. 3.

FIG. 4 is a planar view schematically illustrating a printed circuit board of FIG. 3.

Based on FIGS. 2 to 4, an electronic device 500 according to an example includes display panels 520 and 530 and a printed circuit board 100 connected to the display panels 520 and 530. If necessary, the display device 500 may further include a base board 510 supporting the display panels 520 and 530 and the printed circuit board 100.

The base board 510 may be a main body or a mainboard of an electronic device such as a tablet PC. The display panels 520 and 530 may be, for example, a liquid crystal display (LCD) panel including an array board 520, a color filter board 530 and a liquid crystal layer (not illustrated) disposed therebetween, but are not limited thereto. The display panels 520 and 530 may be organic light emitting diodes (OLED) having a different arrangement.

The printed circuit board 100 may be a rigid-flexible printed circuit board including a rigid region 100R and a flexible region 100F. Meanwhile, as used herein, the term "rigid region" refers to a region having bending characteristics relatively lower than the flexible region, while the term "flexible region" refers to a region having bending characteristics relatively higher than the rigid region. The printed circuit board 100 is connected to the display panels 520 and 530 via the flexible region 100F. For example, the printed circuit board 100 may include a conductor pattern 132, for example, an ACF bonding pad, formed on the flexible region 100F, and may be connected to the display panels 520 and 530 therethrough via ACF bonding. Various types of electronic components 200, for example, active components and/or passive components, may be surface-mounted on at least one surface of the rigid region 100R of the printed circuit board 100. If necessary, various electronic components may be formed inside the rigid region 100R of the printed circuit board 100.

Meanwhile, a display device 500 according to an example may be applied to an electronic device such as a tablet PC, but is not limited thereto, and may be applied to other electronic devices such as a smartphone, and the like. Further, the printed circuit board 100 may be applied to other electronic devices other than the display device 500.

Figure 5:
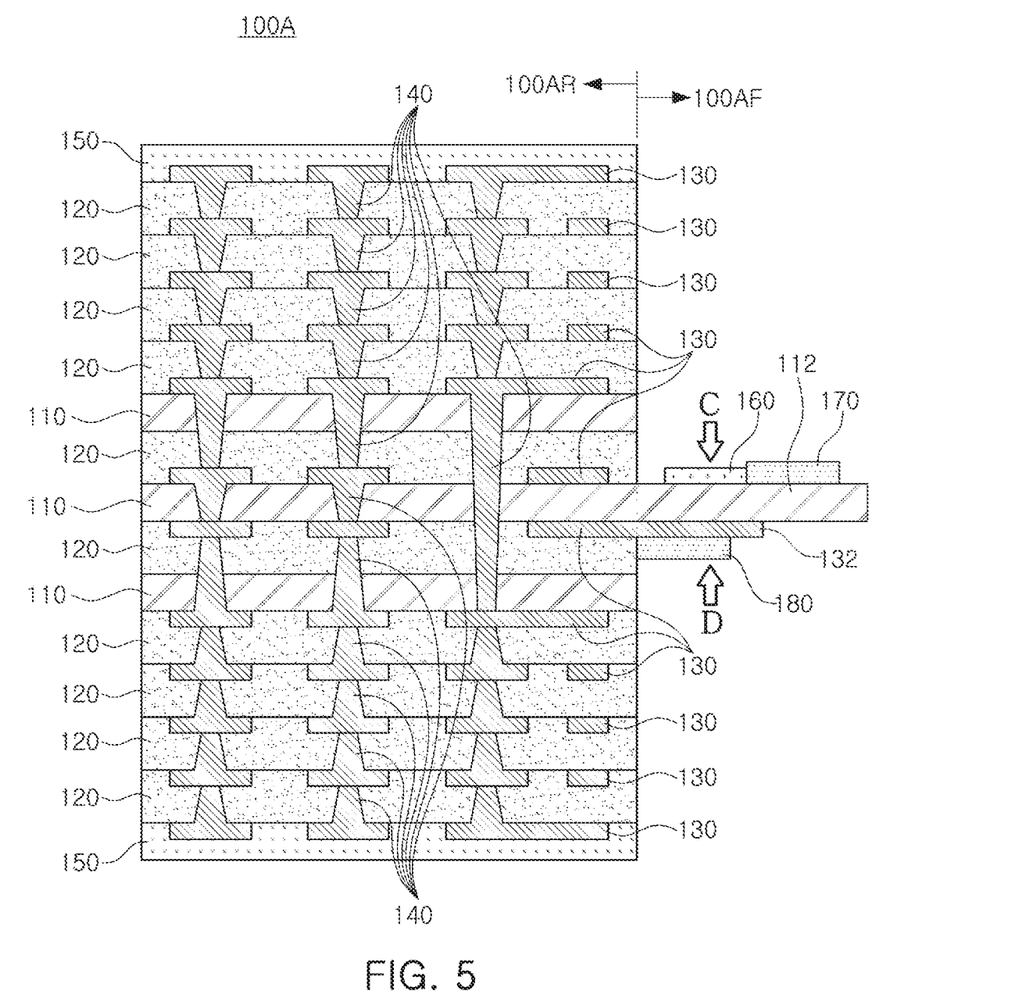
FIG. 5 is a cross-sectional view taken along line B-B' of the printed circuit board of FIG. 4 according to an example.

FIG. 5 is a cross-sectional view taken along line B-B' of the printed circuit board of FIG. 4 according to an example.

Figure 6:
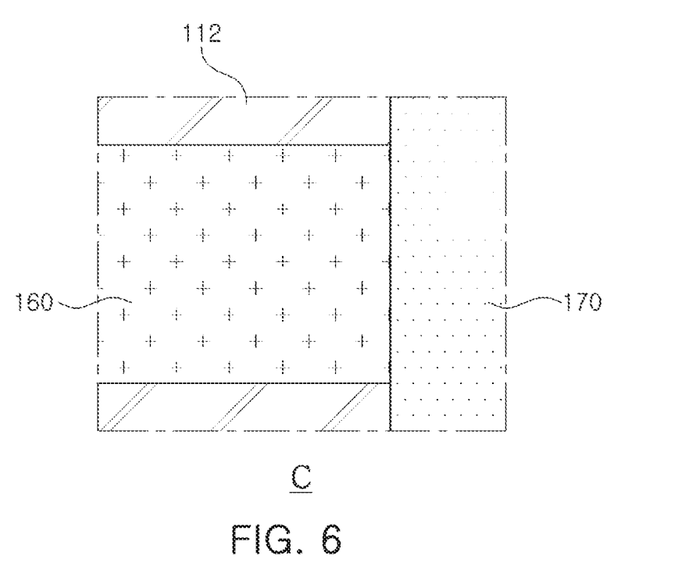
FIG. 6 is a planar view schematically illustrating a flexible region of the printed circuit board of FIG. 5 in a C direction.

FIG. 6 is a planar view schematically illustrating a flexible region of the printed circuit board of FIG. 5 in a C direction.

Figure 7:
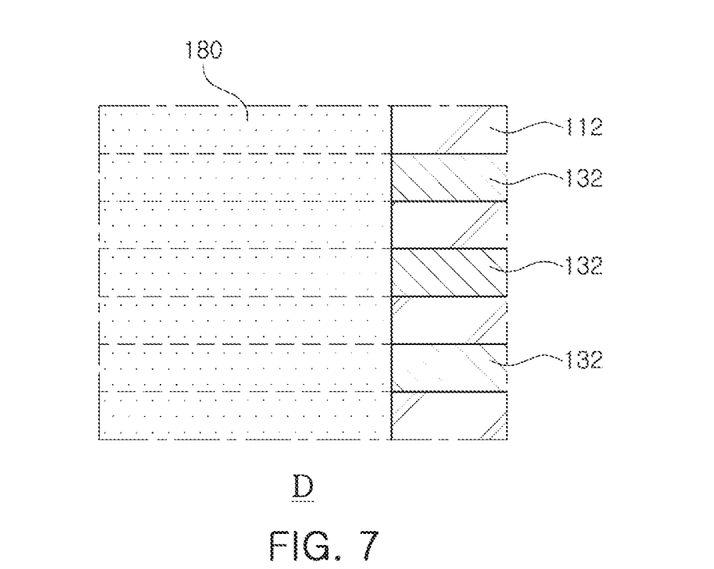
FIG. 7 is a planar view schematically illustrating a flexible region of the printed circuit board of FIG. 5 in a D direction.

FIG. 7 is a planar view schematically illustrating a flexible region of the printed circuit board of FIG. 5 in a D direction.

Based on FIGS. 5 to 7, a printed circuit board 100A according to an example includes a rigid region 100AR and a flexible region 100FR. The rigid region 100AR includes a plurality of insulating layers 110 and 120, a plurality of wiring layers 130 disposed on the plurality of insulating layers 110 and 120 and a plurality of via layers 140 passing through at least one of a the plurality of insulating layers 110 and 120 and connecting the plurality of wiring layers 130. A passivation layer 150 may be disposed on each of an uppermost side and a lowermost side of the rigid region 100AR. The flexible region 100AF includes a flexible layer 112 having an upper surface and a lower surface opposite thereto, a reinforcing structure 160 disposed on the upper surface of the flexible layer 112, and a conductor pattern 132 disposed on the lower surface of the flexible layer 112. A first cover film 170 may be disposed on the upper surface of the flexible layer 112. A second cover film 180 may be disposed on the lower surface of the flexible layer 112. The flexible layer 112 may extend from at least one of the plurality of insulating layers 110 and 120, and the conductor pattern 132 may be connected to at least one of the plurality of wiring layers 130.

As previously described, the printed circuit board 100A according to an example may be disposed with a reinforcing structure 160 on the upper surface of the flexible layer 112 of the flexible region 100AF. A material of the reinforcing structure 160 may have a lower coefficient of thermal expansion than a material of the flexible layer 112 and/or the conductor pattern 132. In this case, as a dimensional change of the reinforcing structure 160 is low, according to a temperature, dimensional stability of the flexible region 100AR, in which the reinforcing structure 160 is disposed, can be improved. Further, more precise dimensional management is feasible, thereby improving yield, quality management, and the like. In addition, the conductor pattern 132, for example, the ACF bonding pad, may be more densely formed. Accordingly, when the printed circuit board 100A according to an example is applied to a display device, more ACF bonding pads can be formed in an equivalent-size space, giving rise to improved resolution. Further, in the case in which the conductor pattern 132 formed on the flexible layer 112 is formed at the beginning of a process and thus is subject to multiple lamination processes, a target dimension and tolerance can be satisfied. Accordingly, a desired level of performance can be reached even after the subsequent processes preceded by the formation of the conductor pattern 132, for example, an ACF bonding pad. Meanwhile, a coefficient of thermal expansion can be measured by a thermomechanical analyzer (TMA) at a glass transition temperature (Tg) or less on the basis of X-Y and may have a unit of ppm/° C.

Meanwhile, the flexible layer 112 may contain a flexible copper clad laminate (FCCL), such as a polyimide, and the like, as described below. The conductor pattern 132 may contain a conventional circuit material, such as copper (Cu) as described below. In contrast, the reinforcing structure 160 may include at least one of Invar and Kovar, which are alloys containing nickel (Ni) and iron (Fe), whose coefficients of thermal expansion are much lower than those of the conductor pattern 132. In this case, the dimensional stability effect can be further enhanced. Additionally, when an alloy, such as Invar and/or Kovar, containing Ni and Fe is used as a material of the reinforcing structure 160, the reinforcing structure 160 may be formed by plating and can be easily removed by etching. Accordingly, even in a conventional printed circuit board process, the reinforcing structure 160 may be formed to have desired shape and thickness in a desired position and can be removed at a required time.

Meanwhile, the reinforcing structure 160 and the conductor pattern 132 on a plane may at least partially overlap. For example, the reinforcing structure 160 may be formed at a position symmetrical to a position where the conductor pattern 132 is disposed on the basis of the flexible layer 112. This improves the above described dimensional stability effect. Further, the reinforcing structure 160 may provide an electromagnetic interference (EMI)-shielding effect on the conductor pattern 132.

In the meantime, the reinforcing structure 160 may be disposed to be exposed from the first cover film 170. For example, the upper surface of the reinforcing structure 160 may not be covered by the first cover film 170. This enables selective removal of at least a portion of the reinforcing structure 160 at a necessary time point. In contrast, a portion of the conductor pattern 132 may be covered by the second cover film 180 while the other portion thereof may be disposed to be exposed from the second cover film 180. For example, a portion of the conductor pattern 132 may be covered by the second cover film 180 to be protected against an external environment, while the other portion is exposed from the second cover film 180 to be more readily utilized as an ACF bonding pad, or the like.

Hereinbelow, constitutional elements of a printed circuit board 100A according to an example will be described in more detail with reference to the drawings.

A plurality of insulating layers 110 and 120 includes a plurality of first insulating layers 110 and a plurality of second insulating layers 120. The first insulating layers 110 may have an elastic modulus smaller than the second insulating layers 120. For example, the first insulating layers 110 may contain relatively flexible materials, while the second insulating layers 120 may contain relatively rigid materials. The first insulating layers 110, may include, for example, a polyimide, but is not limited. Other FCCL materials known in the art can be used as a material of the first insulating layers 110. The second insulating layers 120 may contain a thermosetting resin such as an epoxy resin, a thermoplastic resin such as polyimide, or a glass fiber (a glass cloth and a glass fabric) and/or a material including reinforcing material such as an inorganic filler together with the thermosetting or thermoplastic resin. A prepreg, an Ajinomoto build-up film (ABF), or the like, may be used as the second insulating layers 120, but it is not limited thereto. Other CCL materials known in the art may be used as the second insulating layers 120. Both first and second insulating layers 110 and 120 may be alternately laminated in a center region in a thickness direction. A number of layers of the second insulating layers 120 may be larger than that of the first insulating layers 110. The flexible layer 112 of the flexible region 100AF may extend from the first insulating layer 110.

The plurality of wiring layers 130 may include a metal. As for the metal, copper (Cu), aluminum (Al), silver (Ag), tin (Sn), gold (Au), nickel (Ni), lead (Pb), titanium (Ti), or alloys thereof may be used. The plurality of wiring layers 130 may be formed by a plating process such as an additive process (AP), a semi additive process (SAP), a modified semi additive process (MSAP), tenting (TT), or the like, and as a result, may include a seed layer, which is an electroless plating layer, and an electroplating layer formed based on said seed layer. The plurality of wiring layers 130 may perform various functions according to design of a corresponding layer. For example, a ground pattern, a power pattern, a signal pattern, and the like, may be included. The signal pattern may include various signals, for example, data signals, and the like, excluding the ground patterns and the power patterns. Such patterns may include a line pattern, a pad pattern and/or a plane pattern. The conductor pattern 132 of the flexible region 100AF may extend from at least one pattern of the plurality of wiring layers 130.

A metal may also be used as a material of the plurality of via layers 140, and copper (Cu), aluminum (Al), silver (Ag), tin (Sn), gold (Au), nickel (Ni), lead (Pb), titanium (Ti), or alloys thereof may be used as the metal. The via layers 140 may also be formed by AP, SAP, MSAP, TT, or other plating methods, and may include a seed layer, which is an electroless plating layer, and an electroplating layer formed based on said seed layer. The plurality of via layers 140 may vertically connect the plurality of wiring layers 130 disposed at different levels. The plurality of via layers 140 may perform various functions according to a design of a corresponding layer. For example, wiring vias for a signal connection, a ground connection and a power connection, and the like, may be included. A via of each via layer 140 may be fully charged with a metal or formed of a metal formed along a wall surface. In addition, all known shapes including a cylindrical shape, an hourglass shape, a tapered shape, and the like, may be applied thereto. Some of the via layers 140 can penetrate the first insulating layers 110 only, while some other of the via layers 140 can penetrate the second insulating layers 120 only. In the meantime, the other via layers 140 may penetrate at least one of each of the first and second insulating layers 110 and 120.

The passivation layers 150 may protect an internal constitution of the rigid region 100AR from physical or chemical damage, and the like, from outside. The passivation layers 150 may include a thermosetting resin and an inorganic filler. For example, the passivation layers 150 may be an ABF, but are not limited thereto. The passivation layers 150 may be, for example, solder resist (SR) layers known in the art. Further, a PID may be included if necessary. The passivation layers 150 may contain a same type of materials and may have a substantially same thickness, but are not limited thereto. The passivation layers 150 may contain different materials and have different thicknesses. If necessary, an opening exposing at least a portion of the wiring layers 130 may be formed on the passivation layers 150, and at least the portion of the wiring layers 130 exposed through the opening may be connected to a surface-mounting component via a solder, and the like.

The reinforcing structure 160 is introduced to manage a dimension and thus may contain a material having a CTE smaller than that of the flexible layer 112 and/or conductor pattern 132. Examples of the reinforcing structure 160 are Invar, Kovar, and the like, which are alloys containing Ni and Fe, but are not limited thereto. The reinforcing structure 160 may be formed on a surface opposite to a surface on which the conductor pattern 132 of the flexible layer 112 is formed, and if necessary, may be formed between printed circuit board units or in an external dummy region at a panel level of the printed circuit board.

The cover films 170 and 180 are for protecting the conductor pattern 132, and the like, in the flexible region 100AF from an external environment. A material thereof is not particularly limited as long as an insulating material is included. For example, the cover films 170 and 180 may have a single layer structure of a polyimide film or a multilayer structure of an adhesive layer and a polyimide film formed on the adhesive layer. Alternately, the cover films 170 and 180 may be a conventional heat-resistance tape, or a conventional resist film containing a photosensitive material, but are not limited thereto.

Figure 8:
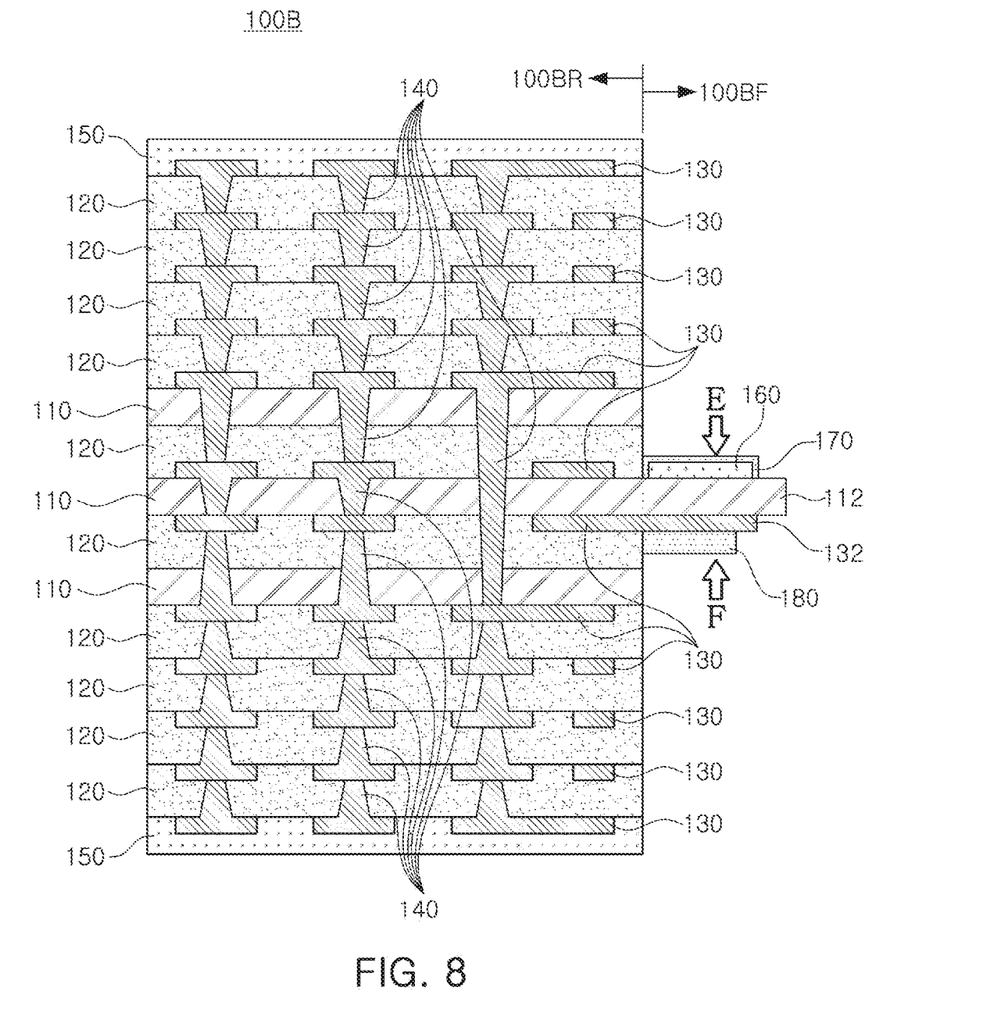
FIG. 8 is a cross-sectional view taken along line B-B' of the printed circuit board of FIG. 4 according to another example.
Figure 9:
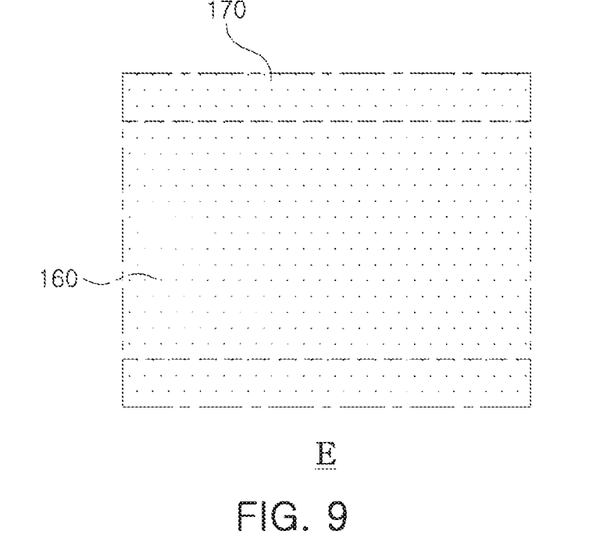
FIG. 9 is a planar view schematically illustrating a flexible region of the printed circuit board of FIG. 8 in an E direction.
Figure 10:
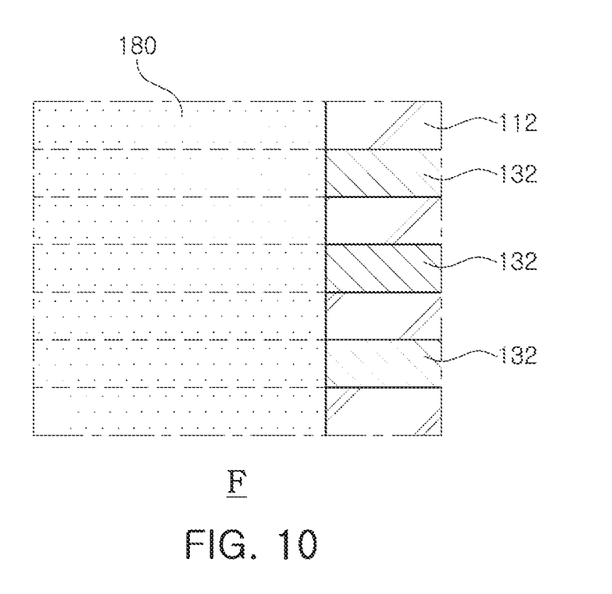
FIG. 10 is a planar view schematically illustrating a flexible region of the printed circuit board of FIG. 8 in an F direction.

FIG. 8 is a cross-sectional view taken along line B-B' of the printed circuit board of FIG. 4 according to another example;

FIG. 9 is a planar view schematically illustrating a flexible region of the printed circuit board of FIG. 8 in an E direction;

FIG. 10 is a planar view schematically illustrating a flexible region of the printed circuit board of FIG. 8 in an F direction.

Based on FIGS. 8 to 10, a printed circuit board 100B according to another example includes a rigid region 100BR and a flexible region 100FR. The rigid region 100BR includes a plurality of insulating layers 110 and 120, a plurality of wiring layers 130 disposed on the plurality of insulating layers 110 and 120 and a plurality of via layers 140 passing through at least one of the plurality of insulating layers 110 and 120 and connecting the plurality of wiring layers 130. A passivation layer 150 may be disposed on each of an uppermost side and a lowermost side of the rigid region 100BR. The flexible region 100BF includes a flexible layer 112 having an upper surface and a lower surface opposite thereto, a reinforcing structure 160 disposed on the upper surface of the flexible layer 112, and a conductor pattern 132 disposed on the lower surface of the flexible layer 112. A first cover film 170 may be disposed on the upper surface of the flexible layer 112. A second cover film 180 may be disposed on the lower surface of the flexible layer 112. The flexible layer 112 may extend from at least one of the plurality of insulating layers 110 and 120, and the conductor pattern 132 may be connected to at least one of the plurality of wiring layers 130.

Meanwhile, in the printed circuit board 100B according to another example, the reinforcing structure 160 is disposed in the flexible region 100BF to overlap with the conductor pattern 132 on a plane such that the reinforcing structure 160 has an area larger than an area in which the conductor pattern 132 is formed. Further, the first cover film 170 is disposed to cover such a reinforcing structure 160. For example, the reinforcing structure 160 may be embedded in the first cover film 170. In this case, a better EMI-shielding effect can be accomplished due to a laminated structure of the reinforcing structure 160 and the first cover film 170. In this regard, an attachment of an additional EMI-shielding film on the second cover film 180 of the flexible region 100BF can be omitted.

Other descriptions are substantially the same as the printed circuit board 100A according to the above described example, and thus, detailed descriptions thereof will be omitted.

FIGS. 11A to 11D are diagrams schematically illustrating a manufacturing process of a printed circuit board.

Figure 11A:
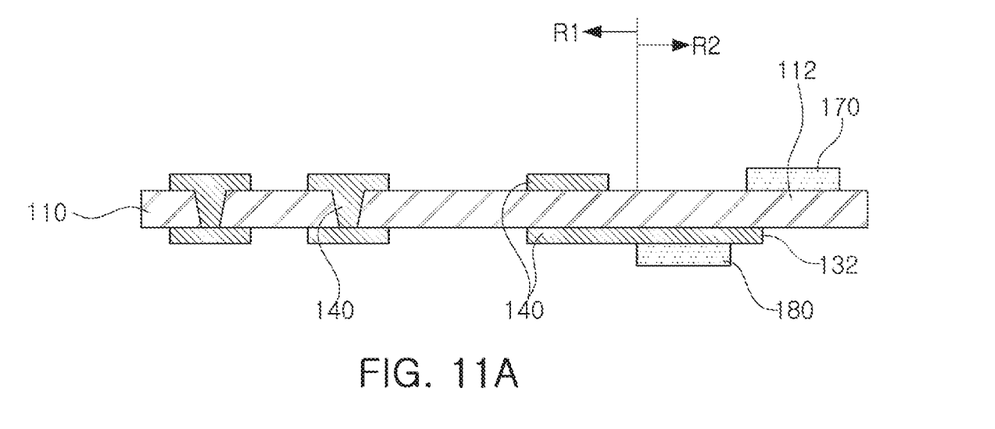
FIGS. 11A to 11D are diagrams schematically illustrating a manufacturing process of a printed circuit board.

Based on FIG. 11A, a flexible layer 110 having a first region R1 and a second region R2 is prepared. The flexible layer 110 may include an FCCL material, such as a polyimide. Each wiring layer 130 is formed on upper and lower surfaces in the first region R1 of the flexible layer 110, while via layers 140 penetrating the flexible layer 110 and connecting wiring layers 130 are formed. Further, a conductor pattern 132 connected to the wiring layer 130 disposed on the lower surface in the first region R1 of the flexible layer 110 is formed on a lower surface in the second region R2 of the flexible layer 110. The wiring layers 130, the via layer 140 and the conductor pattern 132 may be simultaneously formed by the previously described plating processes, such as AP, SAP, MSAP, TT, and the like. If necessary, cover films 17 and 180 may further be formed on both surfaces of the flexible layer 110.

Figure 11B:
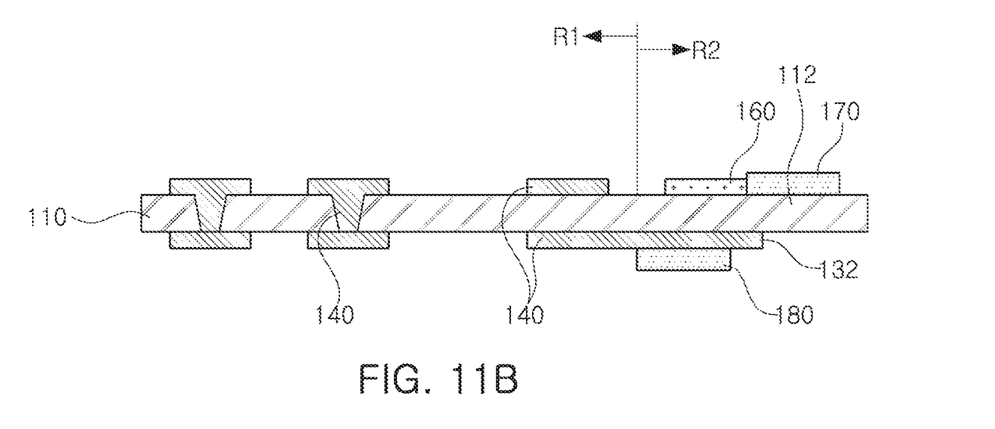

Based on FIG. 11B, a reinforcing structure 160 is formed on an upper surface in the second region R2 of the flexible layer 110. As previously described, the reinforcing structure 160 may be formed using a material having a low CTE by plating. The reinforcing structure 160 may be formed to overlap with the conductor pattern 132 on a plane.

Figure 11C:
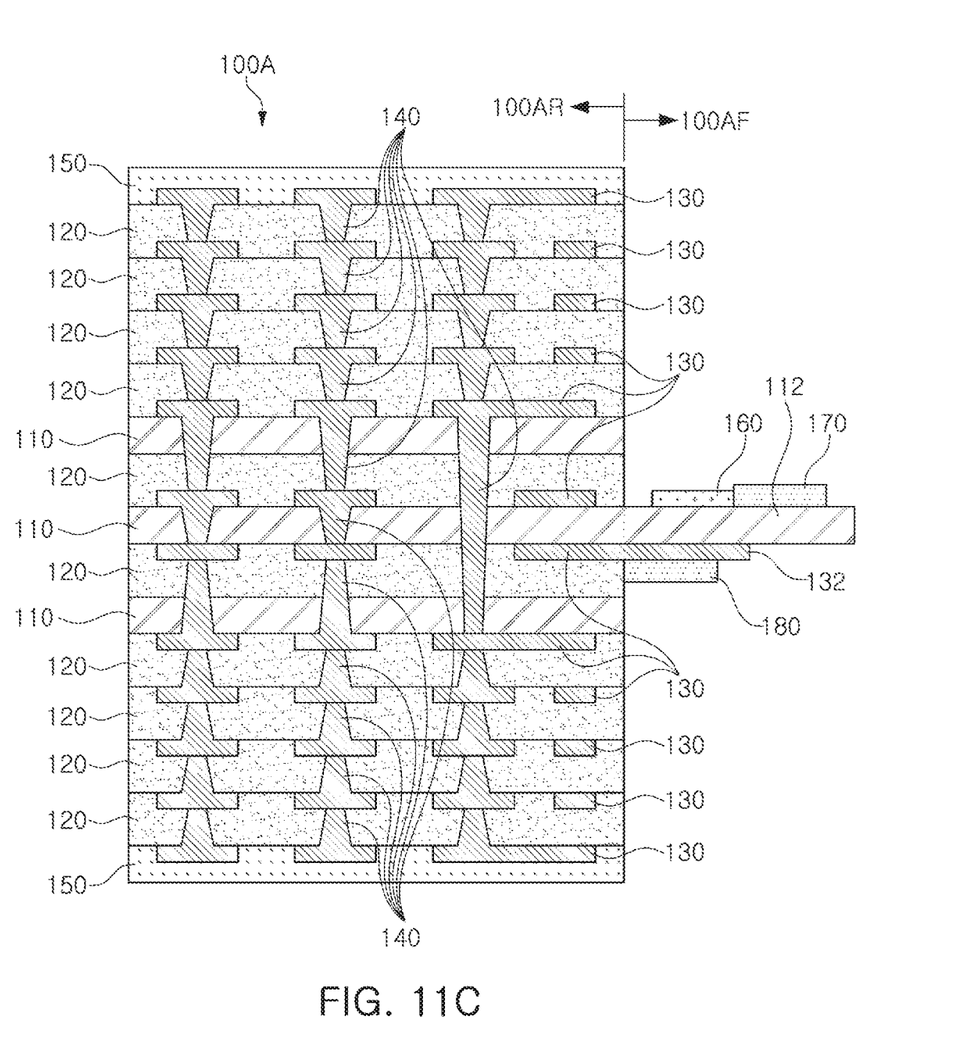

Based on FIG. 11C, a plurality of insulating layers 110 and 120 and a plurality of wiring layers 130 are formed respectively on the upper surface and the other surface in the first region R1 of the flexible layer 110. A plurality of via layers 140 passing through at least a portion of the plurality of insulating layers 110 and 120 are formed. As a result, the first region R1 becomes the above described rigid region 100AR, while the second region R2 becomes the above described flexible region 100AF. If necessary, passivation layers 150 may further be formed on the plurality of insulating layers 110 and 120. The printed circuit board 100A according to the above example may be manufactured through a series of processes.

Figure 11D:
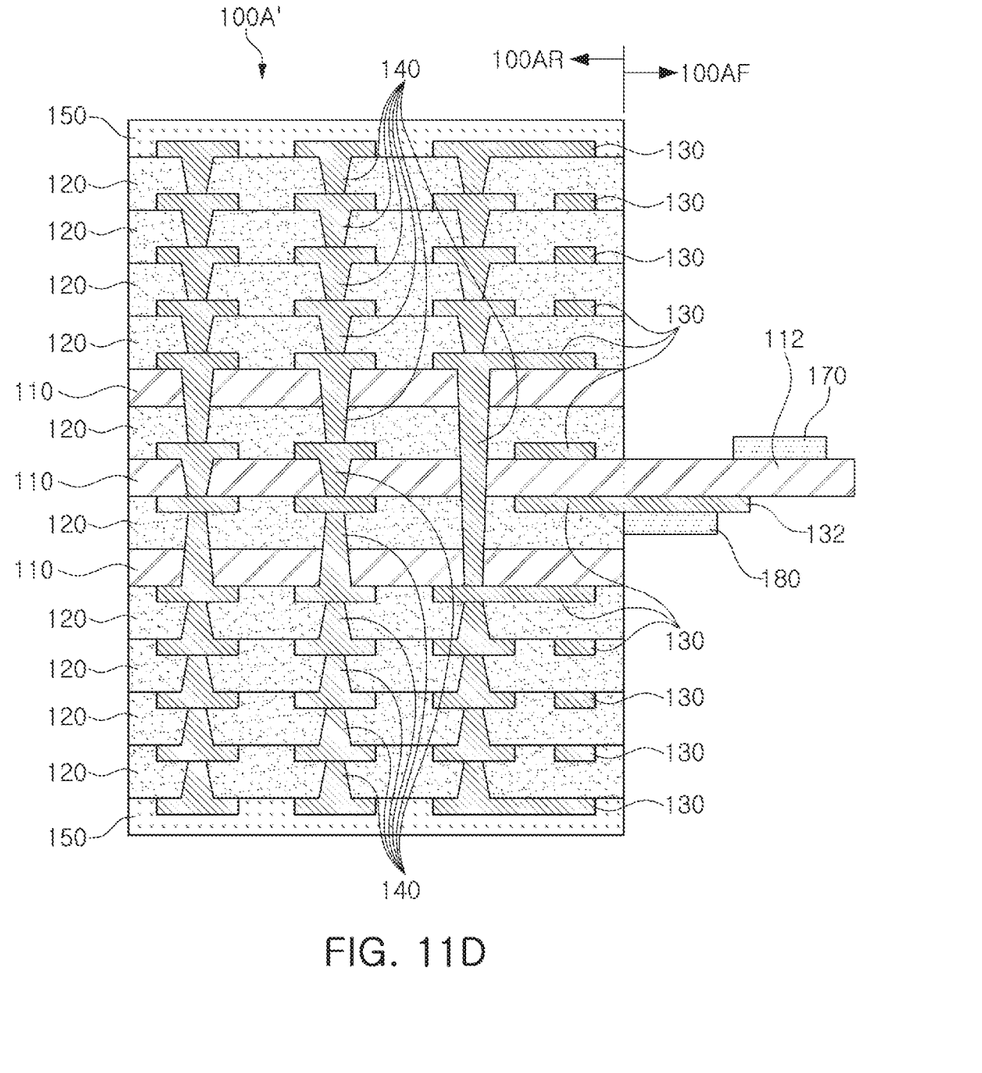

Based on FIG. 11D, at least a portion of the reinforcing structure 160 is removed by etching, if necessary. The removal is a selective process and can thus be performed before the passivation layers 150 are formed. Once removed, a printed circuit board 100A' according to a modified example is formed through the removal. Meanwhile, it can be confirmed through various analysis after being removed that the reinforcing structure 160 is formed first and then removed.

As one of the effects of the present disclosure, a printed circuit board having improved dimensional stability, a display device including the same, and a manufacturing method therefor are provided.

As another effect, a printed circuit board allowing more precise dimension management and capable of having improved yield and quality management, a display device including the same and a manufacturing method therefor are provided.

As another effect, a printed circuit board capable of having a more densely formed anisotropic conductive film (ACF) bonding pad and thus having improved display resolution, a display device including the same and a manufacturing method thereof are provided.

As used herein, the terms "lower side," "lower portion," "lower surface," and the like, are used to refer to a third direction or a surface in said direction, while the terms "upper side," "upper portion", "upper surface," and the like, are used to refer to a direction opposite to the third direction or a surface in said direction. In addition, said spatially relative terms have been used as concepts including a case in which a target component is positioned in a corresponding direction, but does not directly contact a reference component, as well as a case in which the target component directly contacts the reference component in the corresponding direction. However, the terms may be defined as above for ease of description, and the scope of rights of the exemplary examples is not particularly limited to the above terms.

As used herein, the term "connected" may not only refer to "directly connected" but also include "indirectly connected" by means of an adhesive layer, or the like. The term "electrically connected" may include both the case in which constitutional elements are "physically connected" and the case in which constitutional elements are "not physically connected." Further, the terms "first," "second," and the like may be used to distinguish one constitutional element from another, and may not limit a sequence and/or an importance, or others, in relation to the constitutional elements. In some cases, a first constitutional element may be referred to as a second constitutional element, and similarly, a second constitutional element may be referred to as a first constitutional element without departing from the scope of right of the exemplary examples.

As used herein, the term "an example" is provided to emphasize a particular feature, structure, or characteristic, and does not necessarily refer to the same example. Furthermore, the particular characteristics or features may be combined in any suitable manner in one or more examples. For example, a context described in a specific exemplary example may be used in other examples, even if it is not described in the other examples, unless it is described contrary to or inconsistent with the context in the other examples.

Terms used herein are used only in order to describe an exemplary example rather than limiting the present disclosure. In this case, singular forms include plural forms unless interpreted otherwise in context.

What is claimed is:

1. A printed circuit board, comprising:
a rigid region; and
a flexible region comprising a flexible layer having a first surface and a second surface on an opposite side to the first surface, a reinforcing structure disposed on the first surface of the flexible layer, and a conductor pattern disposed on the second surface of the flexible layer,
wherein a material of the reinforcing structure has a coefficient of thermal expansion lower than that of a material of the flexible layer.

2. The printed circuit board of claim 1, wherein the material of the reinforcing structure has the coefficient of thermal expansion lower than that of a material of the conductor pattern.

3. The printed circuit board of claim 2, wherein the reinforcing structure comprises at least one of Invar or Kovar.

4. The printed circuit board of claim 2, wherein the conductor pattern comprises copper (Cu).

5. The printed circuit board of claim 2, wherein the flexible layer comprises polyimide.

6. The printed circuit board of claim 1, wherein the reinforcing structure and the conductor pattern at least partially overlap on a plane.

7. The printed circuit board of claim 1, wherein the flexible region further comprises a first cover film disposed on the first surface of the flexible layer and a second cover film disposed on the second surface of the flexible layer.

8. The printed circuit board of claim 7, wherein the reinforcing structure is exposed from the first cover film.

9. The printed circuit board of claim 8, wherein the reinforcing structure is disposed between the first cover film and the rigid region.

10. The printed circuit board of claim 7, wherein the reinforcing structure is embedded in the first cover film.

11. The printed circuit board of claim 7, wherein the second cover film covers a portion of the conductor pattern and exposes the other portion of the conductor pattern.

12. The printed circuit board of claim 1, wherein the rigid region comprises a plurality of insulating layers, a plurality of wiring layers disposed on the plurality of insulating layers and a plurality of via layers passing through at least one of the plurality of insulating layers and connecting the plurality of wiring layers.

13. The printed circuit board of claim 12, wherein the flexible layer extends from at least one of the plurality of insulating layers, and the conductor pattern is connected to at least one of the plurality of wiring layers.

14. A display device, comprising:

a display panel; and a printed circuit board connected to the display panel;

wherein the printed circuit board comprises a rigid region and a flexible region, wherein the flexible region comprises a flexible layer having a first surface and a second surface on an opposite side to the first surface, a reinforcing structure disposed on the first surface of the flexible layer, and a conductor pattern disposed on the second surface of the flexible layer, and wherein a material of the reinforcing structure has a coefficient of thermal expansion lower than that of a material of the flexible layer.

15. The display device of claim 14, wherein the conductor pattern comprises an anisotropic conductive film (ACF) bonding pad, and the display panel and the printed circuit board are connected via the ACF bonding pad.

16. The display device of claim 14, wherein the material of the reinforcing structure has the coefficient of thermal expansion lower than that of a material of the conductor pattern.

17. The display device of claim 14, wherein the reinforcing structure comprises at least one of Invar or Kovar.

18. A method for manufacturing a printed circuit board, comprising:

preparing a flexible layer comprising a first region and a second region;

forming wiring layers on one surface and the other surface in the first region of the flexible layer, and forming, on one surface in the second region of the flexible layer, a conductor pattern connected to the wiring layer formed on the one surface in the first region of the flexible layer;

forming a reinforcing structure comprising a material having a coefficient of thermal expansion lower than that of a material of the flexible layer on the other surface in the second region of the flexible layer; and respectively forming a plurality of insulating layers and a plurality of wiring layers on the one surface and the other surface in the first region of the flexible layer.

19. The method of claim 18, further comprising removing at least a portion of the reinforcing structure.

20. The method of claim 18, wherein the reinforcing structure comprises at least one of Invar or Kovar.

* * * * *